(12) United States Patent
Arora et al.

(10) Patent No.: US 8,399,534 B2
(45) Date of Patent: Mar. 19, 2013

(54) EC COATING AND INKS HAVING IMPROVED RESISTANCE

(75) Inventors: Ramesh Arora, Markham (CA); Percy Agboat, Toronto (CA)

(73) Assignee: Sun Chemical Corporation, Parsippany, NJ (US)

(*) Notice: Subject to any disclaimer, the term of this patent is extended or adjusted under 35 U.S.C. 154(b) by 190 days.

(21) Appl. No.: 12/864,786

(22) PCT Filed: Jan. 30, 2009

(86) PCT No.: PCT/US2009/032609
§ 371 (c)(1),
(2), (4) Date: Nov. 9, 2010

(87) PCT Pub. No.: WO2009/097509
PCT Pub. Date: Aug. 6, 2009

(65) Prior Publication Data
US 2011/0060069 A1   Mar. 10, 2011

Related U.S. Application Data

(60) Provisional application No. 61/025,720, filed on Feb. 1, 2008.

(51) Int. Cl.
| C08F 2/46 | (2006.01) |
| C08F 2/50 | (2006.01) |
| C09D 11/10 | (2006.01) |
| B29C 71/04 | (2006.01) |
| C03C 25/10 | (2006.01) |
| C08G 61/12 | (2006.01) |
| B01F 3/04 | (2006.01) |

(52) U.S. Cl. ............. 522/64; 522/83; 522/96; 522/103; 522/167; 522/173; 522/182

(58) Field of Classification Search .................. 522/64, 522/83, 96, 103, 167, 173, 182
See application file for complete search history.

(56) References Cited

U.S. PATENT DOCUMENTS

| 2,998,332 | A | 8/1961 | Le Verne |
| 6,248,804 | B1 | 6/2001 | Lutz |
| 6,534,128 | B1 * | 3/2003 | Carlson et al. ............... 427/466 |
| 6,599,958 | B2 | 7/2003 | Lilley |
| 6,797,740 | B2 * | 9/2004 | Abel et al. ..................... 522/81 |
| 7,365,105 | B2 * | 4/2008 | Kiefer-Liptak .............. 522/121 |
| 7,423,072 | B2 * | 9/2008 | Lee et al. ...................... 522/96 |
| 7,503,649 | B2 * | 3/2009 | Kishi et al. ................... 347/100 |
| 7,615,583 | B2 * | 11/2009 | Nakajima ...................... 523/160 |
| 8,063,115 | B2 * | 11/2011 | Loccufier et al. ............... 522/28 |
| 2005/0159501 | A1 | 7/2005 | Kiefer-Liptak |
| 2006/0004116 | A1 | 1/2006 | Kishi et al. |
| 2006/0089450 | A1 | 4/2006 | Jansen et al. |
| 2006/0160925 | A1 | 7/2006 | Nakajima |

OTHER PUBLICATIONS

International Search Report and Written Opinion issued for International Application No. PCT/US2009/032609, International Filing Date Jan. 30, 2009, Date of Mailing Mar. 23, 2009.

* cited by examiner

*Primary Examiner* — Nathan M Nutter
(74) *Attorney, Agent, or Firm* — McKenna, Long & Aldridge, LLP.

(57) ABSTRACT

Energy curable inks formulations are disclosed having improved resistance properties.

20 Claims, No Drawings

EC COATING AND INKS HAVING IMPROVED RESISTANCE

CROSS REFERENCE TO RELATED APPLICATIONS

This application is the United States national phase filing of the corresponding international application number PCT/US2009/032609, filed on Jan. 30, 2009, which claims priority to and benefit of U.S. Application No. 61/025,720, filed Feb. 1, 2008, which applications are hereby incorporated by reference in their entirety.

FIELD OF THE INVENTION

The invention relates generally to energy curable ("EC") inks, primer and coatings, and more specifically to such composition having improved resistance properties.

BACKGROUND OF THE INVENTION

Coatings, primers and inks used in packaging and certain converting purposes may need resistance to heat or steam. Such resistance is difficult to achieve based on the components in the composition, the printing process, the substrate used in the packaging and the use of the packaging itself. One such printing process is flexographic printing.

Flexographic printing is an evolving process. Through the years, advances in press components have enabled printers to achieve higher levels of quality and visual impact. One of the most notable recent developments is the escalating use of EC inks, notably ultra violet ("UV") inks. Offering significant advantages over water and solvent based inks, UV inks are experiencing explosive growth in the flexographic industry.

As industry demands for visual impact increase, printers seek to add color density while preserving or even enhancing image quality. It is the ability of UV inks to positively impact on color density and image quality, while facilitating improvements in printing efficiency that begins to explain its rising popularity. The other and most significant reason for UV's growth is concern over environmental issues.

All types of inks may have many ingredients, but fundamentally an ink has a component which provides color (pigment, dye or colorant) and a liquid base which provides a means of transportation from the ink fountain to the substrate. Other components and additives are included in the ink formulation to control the ink distribution process, fix the pigment onto the substrate, and enhance specific characteristics of the printed image.

When printing with traditional water and solvent-based inks, dryers apply heat to the web. The ink dries through an evaporative process that removes about 35-40% of the delivered ink volume. In other words, you have to deliver 40% more volume to the substrate with water or solvent ink in order to achieve the desired color density.

Solvent-based inks have been popular for many years and provide excellent results on nonabsorbent web surfaces such as poly films. In an era of growing environmental awareness and reducing tolerance for environmental hazards, waste disposal issues are becoming a driving force in the choices manufacturers and printers make. Environmental Protecting Agency (EPA) regulations make use and disposal of solvent materials a cumbersome and expensive process.

This has driven printers to water based inks wherever applicable. Water-based inks have tended to be more difficult to work with on foils, plastics and other difficult substrates, however, and can be very unforgiving.

Cationic inks have been used on such substrates, but their cost is high and the use of cationic inks may not be economical for all printers.

A need exists for a, EC ink, coating and primer composition that can be used on foils, plastics and other difficult substrate applications. Further, a need exists for such inks to be resistant to heat and water, while still maintaining gloss and color strength. A further need exists for such an ink to maintain adhesion and scratch resistance.

These and other needs are met by the present invention.

SUMMARY OF THE INVENTION

The present invention provides an energy curable ink composition comprising:
(a) an Isobornyl Acrylate monofunctional monomer;
(b) a difunctional oligomer selected from the group consisting of bisphenol A epoxy acrylate and polyurethane acrylate;
(c) a photoinitiator;
(d) a reactive diluent
(e) a colorant,
wherein the ratio of the monofunctional monomer to the difunctional oligomer is from about 1:3 to about 1:5.

The present invention also provides a method of preparing an energy curable ink composition comprising mixing the following ingredients:
(a) an Isobornyl Acrylate monofunctional monomer;
(b) a difunctional oligomer selected from the group consisting of bisphenol A epoxy acrylate and polyurethane acrylate;
(c) a photoinitiator;
(d) a reactive diluent
(e) a colorant,
wherein the ratio of the monofunctional monomer to the difunctional oligomer is from about 1:3 to about 1:5.

Other objects and advantages of the present invention will become apparent from the following description and appended claims.

DETAILED DESCRIPTION OF THE INVENTION

This invention is directed to a coating, primer and ink composition and a process to manufacture such compositions. The compositions may be used on hard to adhere substrates like foils, metallized surfaces and various plastic substrates like untreated polystyrenes, polypropylenes, polyesters etc. The compositions may be used on retort packages.

Accordingly, the present invention relates to primer and coating compositions which are especially suitable for adhesion to hard to adhere substrates including foils and other metallized films. Additionally, the inventive ink primer and coating compositions are resistant to water, steam and heat. The inventive ink primer and coating composition are also scratch resistant and have improved adhesion.

The inventive primer, coating and ink compositions may contain oligomers, such as but not limited to acrylates, polyesters, urethanes and the like and combinations thereof. The oligomers aid in adhesion to the substrate. The oligomers may be present in an amount of about 20 wt. % to about 60 wt. %, based on the total weight of the composition, preferably about 30 wt. % to about 50 wt. %.

The inventive primer, coating and ink compositions may contain reactive diluents, such as but not limited to N-vinyl pyrrolidone, N-methyl pyrrolidone, acryloyl morphine, isobutanol acylates, N-vinyl caprolactum (NVC), dicyclopentenyl acrylate (DCPA), octyl/decyl acrylate (ODA), dipropylene glycol diacrylate, tripropylene glycol diacrylate, butanediol diacrylate, hexanediol diacrylate, trimethyol propane triacrylate, ethoxylated trimethylol propane triacrylate, glycerolpropoxy triacrylate, pentaerythritrol triacrylate, dipropylene glycol dimethacrylate, tripropylene glycol dimethacrylate, butanediol dimethacrylate, hexanediol dimethacrylate, trimethyol propane trimethacrylate, and the like, and combinations thereof. The reactive diluent aids in viscosity modification of the composition. The reactive diluent(s) may be present in an amount of about 10 wt. % to about 30%.wt.

The inventive primer, coating and ink compositions may contain a polymerization inhibitor, such as but not limited to an acrylated oligomers. Suitable compounds include benzotriazolealuminium salt amine complexes and the like and combinations thereof. The polymerization inhibitor slows down the polymerization of the coating, primer or ink prior to curing. The polymerization inhibitor may be present in an amount of about 0.01 wt. % to about 1.0%.

The inventive primer, coating and ink compositions may contain a stabilizer, such as but not limited to acrylates. Suitable acrylates include propoxylated glyceryl triacrylate phenoxy ethyl acrylates, substituted benzophenones, hindered amine light stabilizers, and the like and combinations thereof. The stabilizer aids in the EC curing, for example, in UV curing. The stabilizer may be present in an amount of about 0.01 wt. % to about 1.0 wt. %, preferably from about 0.02 wt. % to about 0.1 wt. %.

The inventive primer, coating and ink compositions may contain a photoinitiator, such as but not limited to trimethyl benzoylphenylphosphinate, trimethyl benzophenoxide, benzophenone and its derivatives such para-phenyl benzophenone; acetophenone derivatives such as 1-benzoyl cyclohexan-1-ol, 2-hydroxy-2,2-dimethyl acetophenone, 2,2-dimethoxy-2-phenyl acetophenone, and 4-(2-hydroxyethoxy)phenyl-(2-hydroxy-2-methylpropyl)ketone; thioxanthones such as 2-chloro thioxanthone, 1-chloro-4-propoxy thioxanthone, and isopropyl thioxanthone; and the like and combinations thereof. The photoinitiator aids in polymerization and curing of the composition. The photoinitiator may be present in an amount of about 1.0 wt. % to about 10.0 wt. %, preferably from about 4.0 wt. % to 8.0 wt. %.

The inventive primer, coating and ink compositions may contain a wetting agent, such as a defoamer and the like. A suitable wetting agent is BYK-501, a silicone free defoamer manufactured by BYK-Chemie. The wetting agent may be present in an amount of about 0.1 wt. % to about 5.0 wt. %, preferably from about 0.6 wt. % to about 2.0 wt. %, based on the total weight of the composition.

The inventive primer, coating and ink compositions may contain a UV inhibitor, such as compounds of isocyanatoalky ester. The UV inhibitor may be present in an amount of about 0.01 wt. % to about 2.0 wt. %, preferably from about 0.02 wt. % to about 0.1 wt. %, based on the total weight of the composition.

The inventive primer, coating and ink compositions may contain a colorant, such as but not limited to dyes, pigments, dispersions and the like. The dyes and pigments may be organic or inorganic. The colorants may be in powder form, granule, flush, stir-in, dispersions and the like. The colorant may be included in a dispersion containing a base further including monomers and oligomers. The colorant may be present in an amount of about 10 wt. % to about 60 wt. %, based on the total weight of the composition.

The inventive primer, coating and ink compositions may contain a cure accelerator, such as but not limited to trimethyl benzophenoxide, benzophenone and its derivatives such para-phenyl benzophenone; acetophenone derivatives such as 1-benzoyl cyclohexan-1-ol, 2-hydroxy-2,2-dimethyl acetophenone, 2,2-dimethoxy-2-phenyl acetophenone, and 4-(2-hydroxyethoxy)phenyl-(2-hydroxy-2-methylpropyl) ketone; thioxanthones such as 2-chloro thioxanthone, 1-chloro-4-propoxy thioxanthone, and isopropyl thioxanthone; and the like and combinations thereof. The cure accelerator aids in polymerization and curing of the composition. The cure accelerator may be present in an amount of about 0.01 wt % to about 20.0 wt %, preferably from about 2.0 wt. % to about 10 wt. %, based on the total weight of end product.

The inventive primer, coating and ink compositions may contain an activating agent, such as but not limited to isophorone, or its diisocyanate compounds and the like and combinations thereof. The activating agent aids in adhesion to the substrate. The activating agent may be present in an amount of about 0.01 wt. % to about 1.0 wt. %, based on the total weight of the end product, preferably in an amount of about 0.02 wt. % to about 0.8 wt. %.

The inventive primer, coating and ink compositions may contain an acid, such as but not limited to phosphoric acid, and the like and combinations thereof. The acid aids in water resistance and is an activator for aluminum foil or metallized substrates. The acid may be present in an amount of about 0.01 wt. % to about 0.5 wt. %, based on the total weight of the ink, preferably in an amount of about 0.02 wt. % to about 0.1 wt. %.

As with many printing inks, other additives, alone or in combination may be employed, including but not limited to titanates, defoamers, stabilizers, silicones, plasticizers, waxes, clays, adhesion promoters or reducers, slip promoters or reducers, rub resistance promoters or reducers, water controls, release aids and the like. The additives may be present in an amount of about 0.1 wt. % to about 3.0 wt. % based on the total weight of the end product.

The components of the coating, primer and ink may be mixed in any order of components. A preferred embodiment of the inventive coatings, primer and ink may be formulated by, for example, preparing a primary vehicle first by blending oligomers, monomers, acrylates, wetting agents, stabilizers, photoinitiators, inhibitors and other additives. The oligomer may be heated prior to adding to the vehicle mixture, such as at a temperature of about 70° C. to about 100° C., preferably about 85° C. The blending may occur in any container, such as in a conventional bow type high speed mixers. The vehicle is mixed until fully blended, for example, for about half hour.

The vehicle blend is allowed to cool to about 20-30° C., preferably about 22° C., and gradually added to a UV base composition, while keeping temperatures controlled to less than about 25° C. The UV base may contain colorants and other monomers and oligomers and additives.

A photoinitiator is added along with at least one reactive diluent and inhibitors. Any other additives may be added at this time. The mix is filtered and checked for grind, cure and shades.

The inventive coating, primer and ink composition may be used in any application for which a UV-curable ink is desired. In particular, they are suitable for use on substrates such as foils, metallic films, plastics rubbers, paper, nonwoven materials, glass, ceramic, wood, metal, molded parts, films, cloth, concrete, and the like.

The inventive coating, primer and ink may be used on various printing presses, including but not limited to flexographic, screen, and other known presses. The inventive UV curable coating, primer and ink composition have improved performance, and ease and reduced cost of manufacture compared to traditional cationic compositions. The inventive coating, primer and ink compositions have good or improved gloss (about 50-80%), good or improved adhesion (pass the standard tape test (3M600)) good or improved scratch resistance, and good or improved color strength. Further, the inventive coating, primer and ink compositions maintain such properties while have improved resistance to heat and water and steam.

The inventive coating, primer and inks may be used on packaging substrates, and are especially useful in retort packaging, such as petfoods/other special packaging. Such retort packaging is subject to heat, water and steam exposure and must remain resistant to such exposure while being scratch resistant and still maintaining adhesion to the package substrate, and maintaining color strength and gloss of the printed graphic or text. The inventive compositions exhibit improved adhesion, while not being bound by theory, believed to be due to activated substrate surfaces and an accelerated cure under a controlled UV spectrum to be able to achieve instant adhesion and other desired properties for retortable pouches and difficult plastic substrates.

The practice and advantages of the present invention are disclosed in even greater detail in the following Examples, which are illustrative only and are not intended to limit the invention in any manner whatsoever.

Method of Preparing Heat and Water Resistant Retortable Inks

Ink, primer and coating compositions of the invention were formulated including the following general percentages in Table 1 below. The ink, primer and coating compositions had improved resistance to heat and water while exhibiting no loss in color strength or gloss, as well as having improved adhesion and scratch resistance, and other good performance properties.

TABLE 1

Formulations of ink compositions

| Example 1 Ink Components | Description of Components | Weight Percentages |
| --- | --- | --- |
| Oligomer | acrylate | 1-60 |
| Reactive diluent | N-vinyl pyrrolidone | 10-30 |
| polymerization inhibitor | Acrylated oligomer | |
| Stabilizer | Acrylates | 0.1-1.0 |
| Photoinitiator | trimethyl benzophenoxide | 1-10 |
| Wetting agent | BYK-501 | 0.1-5.0 |
| UV inhibitor | Phosphine oxideCompound | 0.01-2.0 |
| Colorant | Pigment dispersion with UV base (oligomers and monomers and additives) | 10-60 |
| Cure accelerator | trimethyl benzophenoxide | 0.01-20.0 |
| Activating agent | Isophorone | 0.1-1.0 |
| Acid | phosphoric acid | 0.01-1.0 |
| Additives | Additives | 0.01-2.0 each |

The inventive coating, primer and ink were prepared by formulating a primary vehicle by blending oligomers, monomers (mostly acrylates) and wetting agents in conventional bow type high speed mixers for about half hour.

This blend was allowed to cool to 22° C. and gradually added to a UV base compositions containing colorants and further oligomers and monomers, while keeping temperatures controlled to less than 25° C.

Finally, a photoinitiator was added along with a reactive diluent and inhibitors and other additives. The mixes were filtered and checked for grind, cure and shades.

Testing of Ink Formulations

Various colored inks of the invention were formulated as above and tested as set forth below. The ink had good performance properties such as improved resistance to heat and water while exhibiting no loss in color strength or gloss, as well as having improved adhesion and scratch resistance.

The inventive heat resistant and water resistant ink, primer and coating compositions were applied by a flexographic method with different anilox rollers (cell volumes) on an aluminum foil substrate and passed through UV lamps of 200 wpi at 100 fpm.

The inventive compositions were tested for gloss (about 50-80%), adhesion via a standard tape test (3M600/610), and scratch resistance. The inventive compositions were also tested after 48 hours in a retort chamber at a temperature of about 120° C. for about 30 minutes.

The retorted product printed with the inventive compositions, after cooling and drying, passed the above tests. The tests were conducted on aluminum foil (without corona treatment) and the results were good. The inventive compositions exhibited adhesion due to activated substrate surfaces and an accelerated cure under a controlled UV spectrum to be able to achieve instant adhesion and other desired properties for retortable pouches and difficult plastic substrates.

EXAMPLE 1

Preparation of UV Flexo Vehicle for Energy Curable Heat and Water Resistant Inks All weight percentages indicated below are expressed in terms of percentages of the final weight percentage of the vehicle. Isobornyl acrylate (IBOA, 11.3 wt. %) was mixed very well with an organophosphorus compound (stabilizer; 0.5 wt. %) and the mixture was preheated to 55° C. before adding 48.3 wt. % of bisphenol A epoxy acylate. Thereafter, trimethyl benzoylphenylphosphinate (TPO; 4.94 wt. %), acrylate surfactant (flow modifier; 2.0 wt. %), Nitroso tertiary alkane compound (UV polymerization inhibitor; 0.06 wt. %), and propylene glycol acrylate (polymerization inhibitor; 2.0 wt. %) were added and mixed well for 30 minutes at low shear before adding N vinyl Pyrrolidone (30.9 wt. %). The mixture was filtered through nylon and checked for viscosity and grind. The grind (NPIRI) was found to be 2/1 and the viscosity (Brookfield) 1500-2000 cps.

This is the base vehicle and various ratios of pigment blends were added for different colors as indicated below.

EXAMPLE 2

Preparation of Energy Curable Heat and Water Resistant Inks

The following four inks were formulated as follows:

| UVF Yellow: | Wt. % |
| --- | --- |
| Vehicle (Example 1) | 47.4% |
| Perm. Yellow pigment | 13.6% |
| Trimethylpropane Acrylate | 5.7% |
| Polyester acrylate | 14.3% |
| Other additives | 4.0% |
| Trimethylpropane ethoxy triacrylate | 5.2% |
| Epoxy acrylate | 5.0% |
| HR Yellow(22317) | 4.8% |

| UVF Magenta: | Wt. % |
|---|---|
| Vehicle (Example 1) | 47.2% |
| Carmine red (46597) | 8.7% |
| Polyester tetraacrylate | 14.1% |
| Ditrimethylpropane tetraacrylate | 13.4% |
| Other additives | 3.9% |
| Monasral magenta | 6.2% |
| Tetrafunctional polyester acrylates | 6.5% |

| UVF Cyan: | Wt. % |
|---|---|
| Vehicle (Example 1) | 47.2% |
| Polyether tetraacrylate | 10.6% |
| Hexafunctional polyester acrylate | 14.8% |
| Hexanediol diacrylate | 7.0% |
| Spectrapac blue | 18.4% |
| Additives | 2.0% |

| UVF Black | Wt. % |
|---|---|
| Vehicle (Example 1) | 55.8% |
| Sunfast black | 15.6 |
| Spl. resin SC453 | 13.9% |
| Polyether tetraacrylate | 7.0% |
| Alkali blue | 2.0% |
| Hex. polyester acrylate | 2.7% |
| Other additives | 3.0% |

Each of the above four inks was printed (as a primer and then a topcoat) on a heat sealable aluminum foil under the following conditions:

| | |
|---|---|
| Printing method | Flexo |
| Printing press | Mark Andy |
| Print speed | 150 to 250 feet/minute |
| Anilox for primer | 400 lpi |
| All inks | 400 to 1000 lpi |
| Topcoat | 250 lpi (lines per inch) |
| Power of UV lamps | 500 watts/inch |

Procedure for Testing the Retortability of Printed Aluminum Foil Stock

A. Test Equipment Required
 1. A steam pressure vessel for steam temperatures up to 120° C.
 2. A hot plate.
 3. A guillotine cutter.

B. Procedure
 A piece of 4"×6" was cut from the foil stock printed with retortable inks and coating. The pressure vessel was filled with 3 liters of water and heated until it started boiling. The printed sample was immersed into water and the pressure vessel was covered and heated until it reached a temperature of 120° C. The heating was continued for 30 minutes at a high temperature steam. Then, the water was allowed to cool and the sample was taken out and wiped dry.
 The adhesion was checked with 3M-610 tape as follows:
 A strip of tape was placed across the print and allowed to stay on for 1 minute before peeling. To pass the test, the tape should not rupture the inks and pull out clear to meet the retortability criteria.

All formulations were tested as indicated above and passed the retortability—Color retention, formability and adhesion. It was also determined that all formulations met the necessary Tg and Tensile strength criteria. In addition, there was no discoloration of the printed samples of the invention during retort test. Moreover, the inventive samples were embossed and die cut to convert them to a lid and met the necessary requisites of conversion by preserving the edges while the print surfaces had good flexural strength.

The printed aluminum foil stock was also tested for adhesion before and after retort. It was concluded that these inks do not require pre or post print heating at high temperatures to cure the inks.

Comparative ink formulations containing different oligomers or monomers such as Hexanediol Diacrylate (HDODA) and Tripropyleneglycol diacrylate (TRPGDA); or a different monomer/oligomer ratio outside the ⅓ to ⅕ range of the present invention did not pass the retortability test.

The invention has been described in terms of preferred embodiments thereof, but is more broadly applicable as will be understood by those skilled in the art. The scope of the invention is only limited by the following claims.

What is claimed is:

1. An energy curable ink composition comprising:
 (a) an Isobornyl Acrylate monofunctional monomer;
 (b) a difunctional oligomer selected from the group consisting of bisphenol A epoxy acrylate and polyurethane acrylate;
 (c) a photoinitiator;
 (d) a reactive diluent
 (e) a colorant,
 wherein the ratio of the monofunctional monomer to the difunctional oligomer is from about 1:3 to about 1:5.

2. The composition of claim 1, wherein said photoinitiator is Trimethyl Benzoylphenylphosphinate.

3. The composition of claim 1, wherein said reactive diluent is N vinyl Pyrrolidone.

4. The composition of claim 3, wherein the amount of the reactive diluent is at least 10% by weight of the total weight of the composition.

5. The composition of claim 3, wherein the amount of the reactive diluent is less than about 30% by weight of the total weight of the composition.

6. The composition of claim 1 further comprising a surfactant.

7. The composition of claim 6, wherein said surfactant is a dissolved Acrylate.

8. The composition of claim 1 further comprising a polymerization inhibitor.

9. The composition of claim 8, wherein said inhibitor is selected from a nitroso tertiary alkane compound in solution with propylene glycol acrylate, benzotriazolealuminum salt amine complexes and its derivates, and homologs thereof.

10. The composition of claim 1, wherein said colorant is a heat resistant pigment.

11. A method of preparing an energy curable ink composition comprising mixing the following ingredients:
 (a) an Isobornyl Acrylate monofunctional monomer;
 (b) a difunctional oligomer selected from the group consisting of bisphenol A epoxy acrylate and polyurethane acrylate;
 (c) a photoinitiator;
 (d) a reactive diluent
 (e) a colorant,
wherein the ratio of the monofunctional monomer to the difunctional oligomer is from about 1:3 to about 1:5.

12. The method of claim 11, wherein said photoinitiator is Trimethyl Benzoylphenylphosphinate.

13. The method of claim 11, wherein said reactive diluent is N vinyl Pyrrolidone.

14. The method of claim 13, wherein the amount of the reactive diluent is at least 10% by weight of the total weight of the composition.

15. The method of claim 13, wherein the amount of the reactive diluent is less than about 30% by weight of the total weight of the composition.

16. The method of claim 11 further comprising adding a surfactant.

17. The method of claim 16, wherein said surfactant is a dissolved Acrylate.

18. The method of claim 11 further comprising adding a polymerization inhibitor.

19. The method of claim 18, wherein said inhibitor is selected from a nitroso tertiary alkane compound in solution with propylene glycol acrylate, benzotriazolealuminum salt amine complexes and its derivates, and homologs thereof.

20. The composition of claim 11, wherein said colorant is heat resistant pigment.

* * * * *